United States Patent
Lenzi et al.

(10) Patent No.: US 9,528,610 B2
(45) Date of Patent: Dec. 27, 2016

(54) VALVE ASSEMBLY FOR AN INJECTION VALVE AND INJECTION VALVE

(71) Applicant: Continental Automotive GmbH, Hannover (DE)

(72) Inventors: Francesco Lenzi, Leghorn (IT); Valerio Polidori, Leghorn (IT); Stefano Filippi, Castel' Anselmo Collesalvetti (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 2 days.

(21) Appl. No.: 14/423,214

(22) PCT Filed: Sep. 5, 2013

(86) PCT No.: PCT/EP2013/068335
§ 371 (c)(1),
(2) Date: Feb. 23, 2015

(87) PCT Pub. No.: WO2014/037426
PCT Pub. Date: Mar. 13, 2014

(65) Prior Publication Data
US 2015/0219222 A1    Aug. 6, 2015

(30) Foreign Application Priority Data

Sep. 7, 2012    (EP) .................................... 12183407

(51) Int. Cl.
*F16K 31/06*    (2006.01)
*F16K 1/38*    (2006.01)
(Continued)

(52) U.S. Cl.
CPC ............ *F16K 1/38* (2013.01); *F02M 51/0682* (2013.01); *F02M 51/0685* (2013.01);
(Continued)

(58) Field of Classification Search
CPC .... F16K 1/38; F16K 31/0675; F02M 51/0685; F02M 51/0682; F02M 63/0075; F02M 2200/30; F02M 2200/302; F02M 2200/306
(Continued)

(56) References Cited

U.S. PATENT DOCUMENTS

| | | | |
|---|---|---|---|
| 6,305,355 B1 * | 10/2001 | Hoffmann | F02M 47/027 |
| | | | 123/458 |
| 2003/0160117 A1 * | 8/2003 | Stier | F02M 51/0685 |
| | | | 239/585.1 |

(Continued)

FOREIGN PATENT DOCUMENTS

| | | | | |
|---|---|---|---|---|
| EP | 1818584 A2 | 8/2007 | ............ | F16K 31/06 |
| EP | 2444651 A1 | 4/2012 | ............ | F02M 51/06 |
| WO | 2014/037426 A1 | 3/2014 | ............ | F02M 51/06 |

OTHER PUBLICATIONS

European Search Report, Application No. 12183407.1, 5 pages, Feb. 7, 2013.
(Continued)

*Primary Examiner* — William McCalister
*Assistant Examiner* — Ian Paquette
(74) *Attorney, Agent, or Firm* — Slayden Grubert Beard PLLC

(57) ABSTRACT

An injection valve assembly includes a valve body having a central longitudinal axis and a cavity with fluid inlet and outlet portions, a valve needle axially movable in the cavity to control a fluid flow through the fluid outlet portion. The valve needle includes a radially extending retainer element. An electro-magnetic actuator unit including an armature axially movable in the cavity and designed to actuate the valve needle via the retainer element, and a pole piece fixedly coupled to the valve body and including an inner recess, the retainer element being at least partially arranged
(Continued)

in the inner recess. The pole piece includes a stop element extending radially into the inner recess of the pole piece. The stop element has a stop surface facing the fluid outlet portion and the retainer element. The stop surface of the stop element limits the axial movement of the retainer element.

14 Claims, 3 Drawing Sheets

(51) Int. Cl.
*F02M 51/06* (2006.01)
*F02M 63/00* (2006.01)

(52) U.S. Cl.
CPC ..... *F02M 63/0075* (2013.01); *F16K 31/0675* (2013.01); *F02M 2200/30* (2013.01)

(58) Field of Classification Search
USPC . 239/585.1, 585.2, 585.3, 585.4; 251/129.15
See application file for complete search history.

(56) References Cited

U.S. PATENT DOCUMENTS

| | | | |
|---|---|---|---|
| 2006/0226252 A1* | 10/2006 | Kubo | F02M 47/027 239/88 |
| 2012/0204839 A1* | 8/2012 | Ohwada | F02M 51/0614 123/472 |
| 2013/0277460 A1* | 10/2013 | Omeri | F02M 51/0685 239/585.1 |
| 2016/0061139 A1* | 3/2016 | Imai | F02D 41/3845 123/294 |

OTHER PUBLICATIONS

International Search Report and Written Opinion, Application No. PCT/EP2013/068335, 9 pages, Oct. 14, 2013.

\* cited by examiner

VALVE ASSEMBLY FOR AN INJECTION VALVE AND INJECTION VALVE

CROSS-REFERENCE TO RELATED APPLICATIONS

This application is a U.S. National Stage Application of International Application No. PCT/EP2013/068335 filed Sep. 5, 2013, which designates the United States of America, and claims priority to EP Application No. 12183407.1 filed Sep. 7, 2012, the contents of which are hereby incorporated by reference in their entirety.

TECHNICAL FIELD

The invention relates to a valve assembly for an injection valve and an injection valve.

BACKGROUND

Injection valves are in wide spread use, in particular for internal combustion engines where they may be arranged in order to dose the fluid into an intake manifold of the internal combustion engine or directly into the combustion chamber of a cylinder of the internal combustion engine.

Injection valves are manufactured in various forms in order to satisfy the various needs for the various combustion engines. Therefore, for example, their length, their diameter and also various elements of the injection valve being responsible for the way the fluid is dosed may vary in a wide range. In addition to that, injection valves may accommodate an actuator for actuating a needle of the injection valve, which may, for example, be an electromagnetic actuator or piezo electric actuator.

In order to enhance the combustion process in view of the creation of unwanted emissions, the respective injection valve may be suited to dose fluids under very high pressures. The pressures may be in case of a gasoline engine, for example, in the range of up to 200 bar and in the case of diesel engines in the range of more than 2000 bar.

SUMMARY

One embodiment provides a valve assembly for an injection valve, comprising a valve body including a central longitudinal axis, the valve body comprising a cavity with a fluid inlet portion and a fluid outlet portion, a valve needle axially movable in the cavity, the valve needle preventing a fluid flow through the fluid outlet portion in a closing position and releasing the fluid flow through the fluid outlet portion in further positions, the valve needle comprising a retainer element extending in radial direction, and an electro-magnetic actuator unit comprising an armature and a pole piece, the armature being axially movable in the cavity and being designed to actuate the valve needle via the retainer element, the pole piece being fixedly coupled to the valve body and comprising an inner recess, the retainer element being at least partially arranged in the inner recess, wherein the pole piece comprises a stop element extending into the inner recess of the pole piece in radial direction, the stop element has a stop surface facing the fluid outlet portion and the retainer element, and the stop surface of the stop element is designed to limit the axial movement of the retainer element.

In a further embodiment, the armature is at a distance from the pole piece when the retainer element is in contact with the stop surface of the stop element.

In a further embodiment, the stop element is in one piece with the pole piece.

In a further embodiment, the stop element is a part separate from the pole piece.

In a further embodiment, the stop surface of the stop element and/or a stop surface of the retainer element facing the stop surface of the stop element comprise a hardened surface layer.

In a further embodiment, the stop element has an upper surface facing away from the fluid outlet portion, and a dampening element is fixedly coupled to the axial end of the valve needle facing away from the fluid outlet portion, the dampening element extending in radial direction and having a surface facing the fluid outlet portion and the upper surface of the stop element.

In a further embodiment, the stop element is distanced by a residual distance from the dampening element when the valve needle is in the closing position and the magnitude of the residual distance between the stop element and the dampening element is selected such that fluid is compressed between the stop element and the dampening element to dissipate kinetic energy when the dampening element approaches the stop element during the closing of the valve assembly.

In a further embodiment, the valve needle is hollow with an inner space, and the dampening element is shaped as a ring and is basically concentric with the hollow valve needle, the dampening element shaped as a ring having an inner diameter, the inner diameter being dimensioned in a manner that a given fluid flow through the inner space of the valve needle is obtained.

Another embodiment provides an injection valve with a valve assembly as discussed above.

BRIEF DESCRIPTION OF THE DRAWINGS

Exemplary embodiments of the invention are explained below with reference to the drawings, in which.

DETAILED DESCRIPTION

Figure 1:
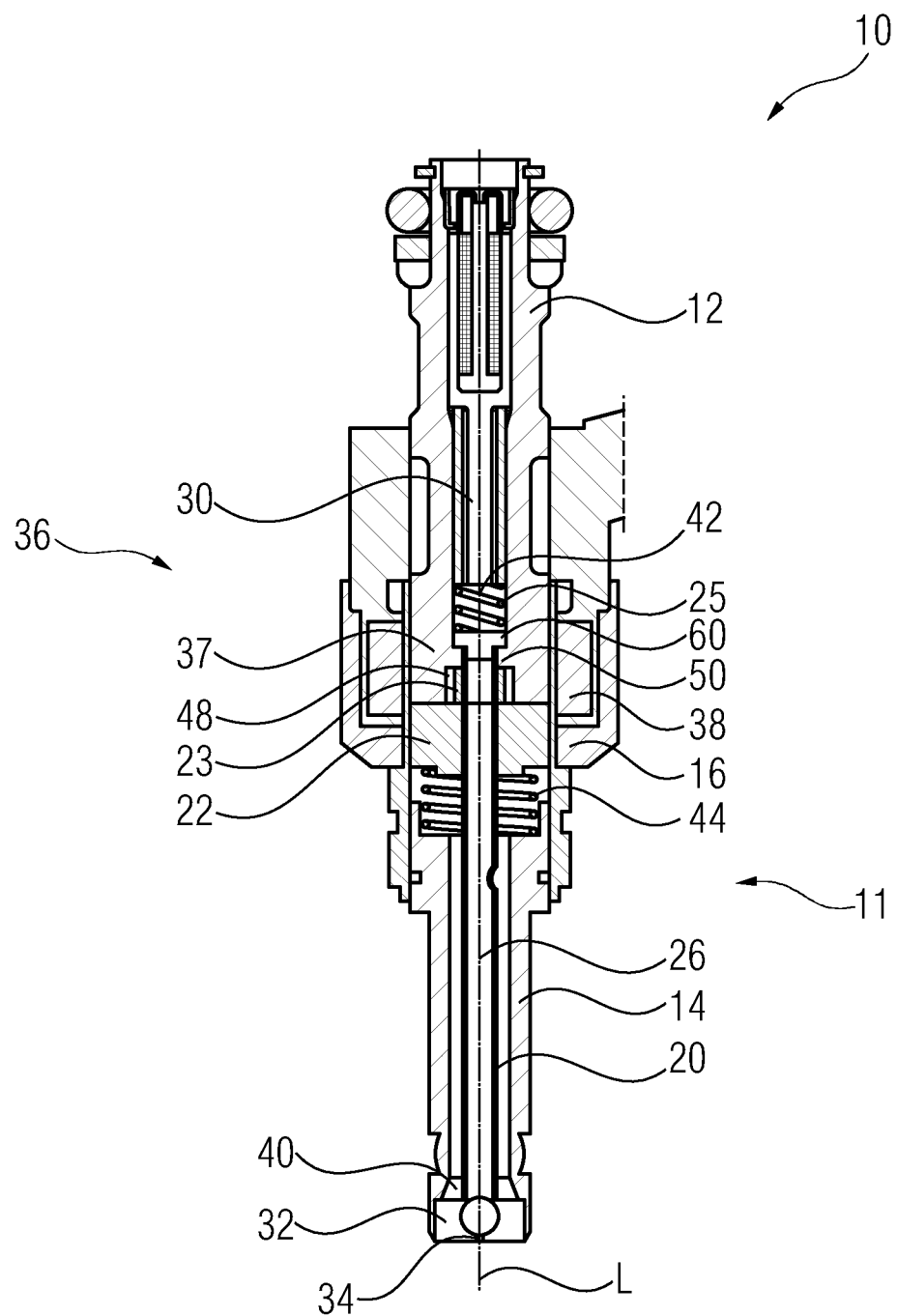
FIG. 1 shows an injection valve with a valve assembly in a longitudinal section view.

Embodiments of the invention provide a valve assembly for an injection valve and an injection valve which are simply to be manufactured and which facilitate a reliable and precise function of the injection valve.

One embodiment provides a valve assembly for an injection valve, comprising a valve body including a central longitudinal axis, the valve body comprising a cavity with a fluid inlet portion and a fluid outlet portion, a valve needle axially movable in the cavity, the valve needle preventing a fluid flow through the fluid outlet portion in a closing position and releasing the fluid flow through the fluid outlet portion in further positions, and an electro-magnetic actuator unit.

The valve needle comprises a retainer element extending in radial direction. For example the retainer element extends in radial direction beyond a barrel of the valve needle. The electro-magnetic actuator unit comprises an armature and a pole piece, the armature being axially movable in the cavity and being designed to actuate the valve needle via the retainer element. Specifically, the armature is coupleable to the retainer element to actuate the valve needle when the valve needle is going out from its closing position. The retainer element may be operable to limit a movement of the armature with respect to the valve needle in one axial direction. The armature may be in the form of a sleeve and surround the barrel so that the barrel is operable to guide the movement of the armature.

The pole piece is fixedly coupled to the valve body and preferably comprises an inner recess. The retainer element may be at least partially arranged in the inner recess. It may expediently be axially moveable with respect to the pole piece. The pole piece comprises a stop element which in particular extends into the inner recess of the pole piece in radial direction. The stop element has a stop surface facing the fluid outlet portion and the retainer element. The stop surface of the stop element is arranged to limit the axial movement of the retainer element, in particular with respect to the pole piece and, thus, to the valve body.

This has the advantage that the axial movement of the retainer element during the opening process of the valve assembly may be stopped by the stop element. Consequently, an overshoot of the valve needle during the opening process may be avoided. By this the fluid mass flow through the fluid outlet portion may be controlled in a very good manner. Consequently, a very good spray stability and a good repeatability of the fluid flow of the valve assembly may be obtained. Consequently, a good dynamic behaviour of the armature and the valve needle may be obtained. A dynamic flow drift caused by wearing effects may be kept small.

In one embodiment, the armature is at a distance from the pole piece when the retainer element is in contact with the stop surface of the stop element. In particular, the armature remains spaced from the pole piece throughout the complete operation of the valve assembly. In this way, a closing time of the valve assembly may be small, for example due to a particularly low residual magnetic force on the armature when the actuator unit is turned off. Furthermore, as the axial movement of the retainer element is limited by the stop element, wearing effects between the armature and the pole piece may be avoided.

In one embodiment the stop element is in one piece with the pole piece. This has the advantage that the stop element may be manufactured together with the pole piece. Therefore, a low cost solution for the assembly of the stop element and the pole piece is possible.

In a further embodiment the stop element is a part separate from the pole piece. This has the advantage that the stop element may be manufactured separately from the pole piece. Consequently, a particular treatment such as a surface treatment of the stop element may easily be obtained, in particular independent from the pole piece.

In a further embodiment the stop surface of the stop element and/or a stop surface of the retainer element facing the stop surface of the stop element comprise a hardened surface layer. This has the advantage that wearing effects of the retainer element and/or the stop element in the contact area between the retainer element and/or the stop element may be kept small. Furthermore, a static flow drift caused by the wearing effects may be kept small.

In a further embodiment the stop element has an upper surface facing away from the fluid outlet portion, and a dampening element is fixedly coupled to the axial end of the valve needle facing away from the fluid outlet portion, the dampening element extending in radial direction and having a surface facing the fluid outlet portion and the upper surface of the stop element. With advantage, the upper surface of the stop element and the surface of the dampening element facing the upper surface of the stop element may be arranged in such fashion that fluid is compressed between the stop element and the dampening element when the two surfaces approach each other during a closing event of the valve assembly. Consequently, the closing of the valve needle may be dampened. Consequently, bouncing during the closing process of the valve assembly may be avoided.

In a further embodiment the valve needle—for example the barrel of the valve needle—is hollow with an inner space, and the dampening element is shaped as a ring and is preferably basically concentric with the hollow valve needle. The dampening element shaped as a ring has an inner diameter. The inner diameter is dimensioned in a manner that a given fluid flow through the inner space of the valve needle is obtained. In particular, the inner diameter is smaller than a diameter of the inner space of the valve needle. For example it has a value of 50% or less and/or of 5% or more of the diameter of the inner space. This has the advantage that fluid pressure pulsations from the fluid inlet portion may be kept small in the fluid outlet portion.

Another embodiment provides an injection valve comprising the valve assembly as discussed above.

Figure 2:
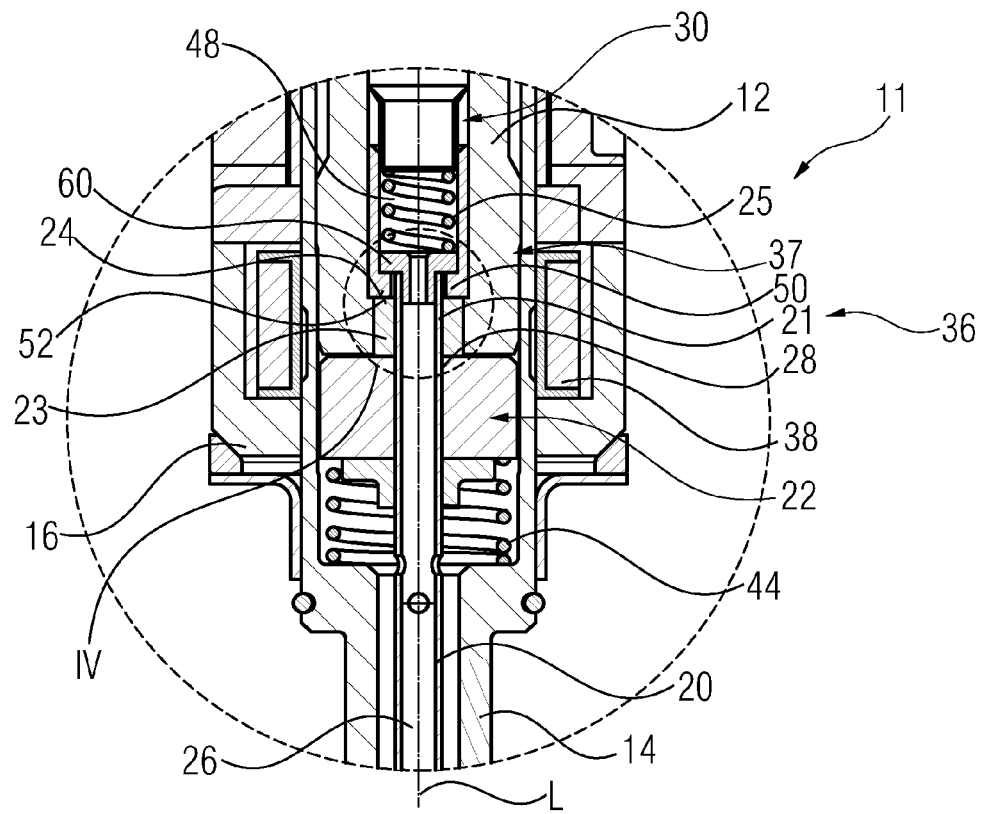
FIG. 2 shows an enlarged view of a section of the valve assembly.
Figure 3:
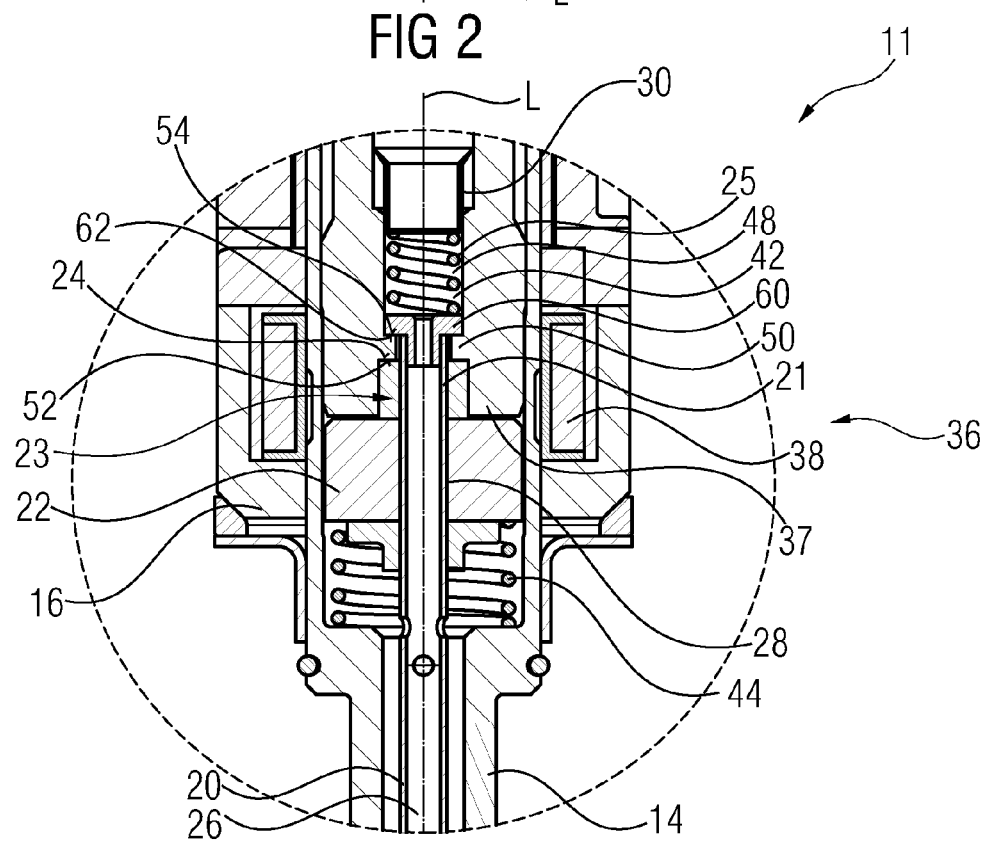
FIG. 3 shows an enlarged view of a section of a variant of the valve assembly.

An injection valve 10 (FIG. 1) that is in particular suitable for dosing fuel to an internal combustion engine comprises in particular a valve assembly 11 (FIGS. 2 and 3). Furthermore, the injection valve 10 comprises an inlet tube 12.

The valve assembly 11 comprises a valve body 14 with a central longitudinal axis L. The valve assembly 11 has a housing 16 which is partially arranged around the valve body 14.

The valve body 14 comprises a cavity 18. The cavity 18 takes in a valve needle 20 and an armature 22. The valve needle 20 is hollow with an inner space 26. The valve needle 20 and the armature 22 are axially movable in the cavity 18. The armature 22 and the valve needle 20 are also axially moveable with respect to each other.

At an axial end 21 of the valve needle 20, the valve needle 20 comprises a retainer element 23. The retainer element 23 extends in radial direction so that it is formed as a collar around the axial end 21 of the valve needle 14. The retainer element 23 is fixedly coupled to the axial end 21 of the valve needle 20. The retainer element 23 has a stop surface 24.

A calibration spring 25 is arranged inside the inlet tube 12. The calibration spring 25 is mechanically coupled to the retainer element 23. The retainer element 23 forms a first seat for the calibration spring 25.

The armature 22 has a recess 28 so that it in particular is in the form of a sleeve. The valve needle 20 is in contact with an inner surface of the armature 22 so that the latter can guide the valve needle 14 in axial direction in the recess 28 of the armature 22.

A filter element 30 is arranged in the inlet tube 12 and forms a further seat for the calibration spring 25. During the manufacturing process of the injection valve 10, the filter element 30 can be axially moved into the inlet tube 12 in order to preload the calibration spring 25 in a desired manner. After manufacturing, the filter element 30 is expediently positionally fixed with respect to the valve body 14, for example by means of an interference fit. In this way, the calibration spring 25 exerts a force on the valve needle 20 towards an injection nozzle 34 of the injection valve 10.

In a closing position of the valve needle 20 it sealingly rests on a seat plate 32 by this preventing a fluid flow through the at least one injection nozzle 34. The injection nozzle 34 may be, for example, an injection hole.

The valve assembly 11 is provided with an actuator unit 36 that is preferably an electro-magnetic actuator. The electro-magnetic actuator unit 36 comprises a pole piece 37 which is fixedly coupled to the valve body 14. Furthermore, the electro-magnetic actuator unit 36 comprises a coil 38 which is preferably arranged inside the housing 16. Furthermore, the electro-magnetic actuator unit 36 comprises the armature 22. The housing 16, the pole piece 37 and the armature 22 are forming an electromagnetic circuit.

A fluid outlet portion 40 is a part of the cavity 18 near the seat plate 32. The fluid outlet portion 40 communicates with a fluid inlet portion 42 which is provided in the valve body 14.

An armature spring 44 is arranged in the cavity 18. Preferably, the armature spring 44 is a coil spring. The armature spring 44 is supported by the valve body 14. The armature spring 44 forms a support element for the armature 22.

The pole piece 37 has an inner recess 48. The retainer element 23 is arranged inside the inner recess 48 of the pole piece 37 and axially moveable with respect to the pole piece 37. The pole piece 37 has a stop element 50 extending into the inner recess 48 of the pole piece 37 in radial direction. Preferably, the stop element 50 is shaped as a ring element. The stop element 50 overlaps with the retainer element 23 when viewed in axial direction.

In the embodiment shown in FIG. 2 the stop element 50 is separate from the pole piece 37. In this embodiment the stop element 50 may be treated particularly, for example a surface of the stop element 50 may be tempered. In the embodiment shown in FIG. 3 the stop element 50 is in one piece with the pole piece 37. In this embodiment the stop element 50 may be manufactured together with the pole piece 37.

The stop element 50 has a stop surface 52 which faces the fluid outlet portion 40. The stop surface 52 may limit the axial movement of the retainer element 23 and consequently, the axial movement of the valve needle 20. The stop element 50 has an upper surface 54 facing the fluid inlet portion 42.

Figure 4A:
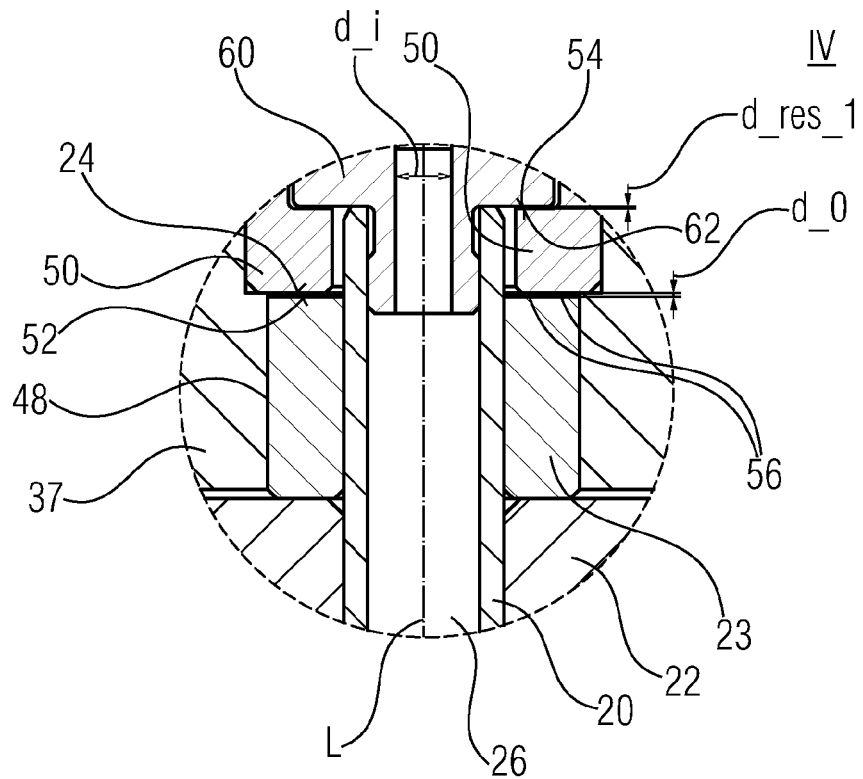
FIGS. 4A and 4B are detailed views of a section IV of the valve assembly of FIG. 2.
Figure 4B:
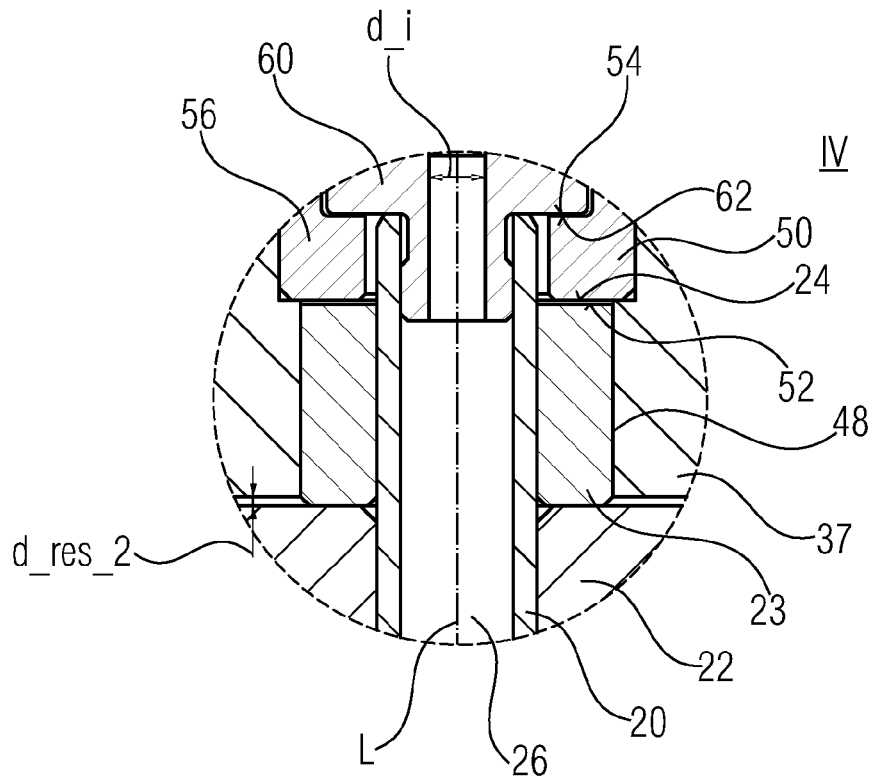

Preferably, the stop surface 52 of the stop element 50 comprises a hardened surface layer 56. Alternatively or additionally the stop surface 24 of the retainer element 23 facing the stop surface 52 of the stop element 50 comprises the hardened surface layer 56 (FIGS. 4A, 4B). Preferably the hardened surface layer 56 is a chrome plated layer.

A dampening element 60 is fixedly coupled to the axial end 21 of the valve needle 20. The dampening element 60 extends in radial direction. The dampening element 60 has a surface 62 which faces the fluid outlet portion 40 and the upper surface 54 of the stop element 50 as can be best seen in FIGS. 4A and 4B.

The calibration spring 25 is directly coupled to the dampening element 60, i.e. in particular directly contacts the dampening element 60. Due to the radial extension of the dampening element 60, a big contact surface between the dampening element 60 and the calibration spring 25 may be achieved.

The dampening element 60 is shaped as a ring. The dampening element 60 is concentric with the hollow valve needle 20. The ring-shaped dampening element 60 has an inner diameter d_i (FIGS. 4A, 4B). Depending on the measure of the inner diameter d_i a given fluid flow through the inner space 26 of the valve needle 20 may be obtained. Consequently, pressure pulsations of the fluid in the fluid inlet portion 42 may be dampened until the fluid reaches the fluid outlet portion 40.

In the following, the function of the injection valve 10 is described in detail:

The fluid is led through the filter element 30 to the fluid inlet portion 42. Subsequently, the fluid is led towards the fluid outlet portion 40. The valve needle 20 prevents a fluid flow through the fluid outlet portion 40 in the valve body 14 in a closing position of the valve needle 20 (FIG. 4A). Outside of the closing position of the valve needle 20, the valve needle 20 enables the fluid flow through the fluid outlet portion 40 (FIG. 4B).

In the case when the actuator unit 36 is de-energized the calibration spring 25 can force the valve needle 20 to move in axial direction in its closing position. It is depending on the force balance between the force on the valve needle 20 caused by the actuator unit 36 with the coil 38 and the force on the valve needle 20 caused by the calibration spring 25 whether the valve needle 20 is in its closing position or not.

Starting point of the following description of the function of the injection valve 10 is FIG. 4A with the valve needle 20 being in the closing position. In this situation the armature 22 is axially distanced from the pole piece 37. Furthermore, the retainer element 23 has an axial distance d_0 from the stop element 50. Furthermore, the dampening element 60 has a first residual distance d_res_1 from the stop element 50.

In the case when the electro-magnetic actuator unit 36 with the coil 38 gets energized the actuator unit 36 may effect an electro-magnetic force on the armature 22. The armature 22 is attracted by the pole piece 37 and moves in axial direction away from the fluid outlet portion 40. The armature 22 takes the valve needle 20 with it by means of mechanical interaction with the retainer element 23.

Consequently, the valve needle 20 moves in axial direction out of the closing position. Outside of the closing position of the valve needle 20, fluid can pass through the injection nozzle 34. Movement of the valve needle 20 is stopped when the retainer element 23 is in close contact with the stop element 50 (FIG. 4B). In this constellation the armature 22 is still distanced by a second residual distance d_res_2 from the pole piece 37. The stop element 50 is distanced from the dampening element 60 by a distance larger than the first residual distance d_res_1. As can be seen from a comparison between the situation of FIGS. 4A and 4B, the axial distance d_0 between the stop element 50 and the retainer element 23 when the valve needle 20 is closed represents the lift of the valve needle 20.

Due to the second residual distance d_res_2 between the armature 22 and the pole piece 37 during the opening of the valve needle 20 a direct contact between the armature 22 and the pole piece 37 may be avoided during the complete operation of the injection valve 10. Instead, the movement of valve needle 20 itself is stopped by establishing a form-fit connection between the stop element 50 and the retainer element 23 when the valve assembly 11 has reached the opened configuration. Therefore, an overshoot of the valve needle 20 during the opening of the valve needle 20 may be avoided. Consequently, a part to part variation between different injection valves 10 due to differences of the overshoot effect may be kept small.

Furthermore, due to the second residual distance d_res_2 between the armature 22 and the pole piece 37 during the opening of the valve needle 20 the closing time may be kept small as a small residual magnetic force between the armature 22 and the pole piece 37 may be obtained when the actuator unit 36 gets de-energized. In addition, wearing between the armature 22 and the pole piece 37 may be avoided. Consequently, a good long term stability of the valve needle 20 and the armature 22 may be obtained. Consequently, a flow drift caused by wearing may be avoided as well.

Additionally, the magnitude of the second residual distance d_res_2 between the armature 22 and the pole piece 37 may be selected such that it enables a compression of fluid between the armature 22 and the pole piece 37 for dampening the opening process of the injection valve 10 when the armature 22 approaches the pole piece 37 during the opening of the valve needle 20.

The magnitude of the first residual distance d_res_1 between the stop element 50 and the dampening element 60 may be selected such that fluid is compressed between the stop element 50 and the dampening element 60 to dissipate kinetic energy of moving parts of the injection valve 10 when the dampening element 23 approaches the stop element 50 during the closing of the valve assembly 11. In this way, bouncing of the valve needle 20 during the closing process may be avoided.

The invention is not limited to specific embodiments by the description on the basis of said exemplary embodiments but comprises any combination of elements of different embodiments. Moreover, the invention comprises any combination of claims and any combination of features disclosed by the claims.

What is claimed is:

1. A valve assembly for an injection valve, the valve assembly comprising:
   a valve body including a central longitudinal axis,
   the valve body comprising a cavity with a fluid inlet portion and a fluid outlet portion,
   a valve needle axially movable in the cavity, the valve needle preventing a fluid flow through the fluid outlet portion in a closing position of the valve needle and releasing the fluid flow through the fluid outlet portion in further positions of the valve needle,
   the valve needle comprising a retainer element extending in a radial direction, and
   an electro-magnetic actuator unit comprising an armature and a pole piece,
   the armature axially movable in the cavity and configured to actuate the valve needle via the retainer element,
   the pole piece fixedly coupled to the valve body and comprising an inner recess,
   the retainer element at least partially arranged in the inner recess,
   wherein the pole piece comprises a stop element extending into the inner recess of the pole piece in a radial direction,
   the stop element has a stop surface facing the fluid outlet portion and the retainer element,
   the stop surface of the stop element limits the axial movement of the retainer element
   the stop element has an upper surface facing away from the fluid outlet portion, and
   a dampening element is fixedly coupled to an axial end of the valve needle facing away from the fluid outlet portion,
   wherein the dampening element extends radially and has a surface facing the fluid outlet portion and the upper surface of the stop element.

2. The valve assembly of claim 1, wherein the armature is at a distance from the pole piece when the retainer element is in contact with the stop surface of the stop element.

3. The valve assembly of claim 1, wherein the stop element and the pole piece are formed as one integral piece.

4. The valve assembly of claim 1, wherein the stop element and the pole piece are discrete components.

5. The valve assembly of claim 1, wherein at least one of (a) the stop surface of the stop element and (b) a stop surface of the retainer element facing the stop surface of the stop element comprises a hardened surface layer.

6. The valve assembly of claim 1, wherein the stop element is distanced by a residual distance from the dampening element when the valve needle is in the closing position and a magnitude of the residual distance between the stop element and the dampening element is selected such that fluid is compressed between the stop element and the dampening element to dissipate kinetic energy when the dampening element approaches the stop element during a closing of the valve assembly.

7. The valve assembly of claim 1, wherein the valve needle is hollow with an inner space, and the dampening element is shaped as a ring and is concentric with the hollow valve needle, wherein the dampening element is shaped as a ring having an inner diameter, the inner diameter being dimensioned such that a given fluid flow through the inner space of the valve needle is obtained.

8. An injection valve comprising:
   a valve body including a central longitudinal axis,
   the valve body comprising a cavity with a fluid inlet portion and a fluid outlet portion,
   a valve needle axially movable in the cavity, the valve needle preventing a fluid flow through the fluid outlet portion in a closing position of the valve needle and releasing the fluid flow through the fluid outlet portion in further positions of the valve needle,
   the valve needle comprising a retainer element extending in a radial direction, and
   an electro-magnetic actuator unit comprising an armature and a pole piece,
   the armature axially movable in the cavity and configured to actuate the valve needle via the retainer element,
   the pole piece fixedly coupled to the valve body and comprising an inner recess,
   the retainer element at least partially arranged in the inner recess,
   wherein the pole piece comprises a stop element extending into the inner recess of the pole piece in a radial direction,
   the stop element has a stop surface facing the fluid outlet portion and the retainer element,
   the stop surface of the stop element limits the axial movement of the retainer element
   the stop element has an upper surface facing away from the fluid outlet portion, and
   a dampening element is fixedly coupled to an axial end of the valve needle facing away from the fluid outlet portion,
   wherein the dampening element extends radially and has a surface facing the fluid outlet portion and the upper surface of the stop element.

9. The injection valve of claim 8, wherein the armature of the valve assembly is at a distance from the pole piece when the retainer element is in contact with the stop surface of the stop element.

10. The injection valve of claim 8, wherein the stop element and the pole piece of the valve assembly are formed as one integral piece.

11. The injection valve of claim 8, wherein the stop element and the pole piece of the valve assembly are discrete components.

12. The injection valve of claim 8, wherein at least one of (a) the stop surface of the stop element and (b) a stop surface of the retainer element facing the stop surface of the stop element comprises a hardened surface layer.

13. The injection valve of claim 8, wherein the stop element is distanced by a residual distance from the dampening element when the valve needle is in the closing position and a magnitude of the residual distance between the stop element and the dampening element is selected such that fluid is compressed between the stop element and the dampening element to dissipate kinetic energy when the dampening element approaches the stop element during a closing of the valve assembly.

14. The injection valve of claim 8, wherein the valve needle is hollow with an inner space, and the dampening element is shaped as a ring and is concentric with the hollow valve needle, wherein the dampening element is shaped as a ring having an inner diameter, the inner diameter being dimensioned such that a given fluid flow through the inner space of the valve needle is obtained.

* * * * *